(12) United States Patent
White et al.

(10) Patent No.: US 12,274,281 B2
(45) Date of Patent: Apr. 15, 2025

(54) SYSTEM AND METHOD FOR TREATMENT OF FOOD WITH A GAS

(71) Applicant: Clean Crop Technologies, Inc., Holyoke, MA (US)

(72) Inventors: Daniel White, Chesterfield, MA (US); Yaqoot Shaharyar, Northampton, MA (US); Kevin Keener, Ashland, OH (US); Daniel Cavanaugh, Hadley, MA (US)

(73) Assignee: Clean Crop Technologies, Inc., Holyoke, MA (US)

( * ) Notice: Subject to any disclaimer, the term of this patent is extended or adjusted under 35 U.S.C. 154(b) by 0 days.

(21) Appl. No.: 17/590,929

(22) Filed: Feb. 2, 2022

(65) Prior Publication Data

US 2022/0386656 A1 Dec. 8, 2022

Related U.S. Application Data

(60) Provisional application No. 63/291,756, filed on Dec. 20, 2021, provisional application No. 63/195,415, filed on Jun. 1, 2021.

(51) Int. Cl.
*A23L 3/32* (2006.01)
*A23B 2/60* (2025.01)
(Continued)

(52) U.S. Cl.
CPC .............. *A23B 2/605* (2025.01); *A23B 2/60* (2025.01); *B01J 19/08* (2013.01); *H05H 1/2406* (2013.01)

(58) Field of Classification Search
CPC ... A23L 3/325; A23L 3/32; A23L 2/50; A23L 2/02; A23L 3/26; B01J 19/08; H05H 1/24;
(Continued)

(56) References Cited

U.S. PATENT DOCUMENTS 6,441,554 B1 8/2002 Nam et al.
8,551,546 B2 10/2013 Rasanayagam et al.
(Continued)

FOREIGN PATENT DOCUMENTS

CN 106061089 A 10/2016
CN 108322983 A 7/2018
(Continued)

OTHER PUBLICATIONS

Cullen et al, "Translation of plasma technology from the lab to the food industry", Plasma Process Polym., 2018; 15. (Year: 2018).*

(Continued)

*Primary Examiner* — Xiuyu Tai
(74) *Attorney, Agent, or Firm* — COOLEY LLP (57) ABSTRACT

A system for treating food, the system including: a direct barrier discharge system including a pair of electrodes separated by a gap of at least 0.5 cm, wherein the direct barrier discharge system is configured to provide a feed gas between the electrodes, wherein the feed gas includes nitrogen and water, wherein a content of nitrogen in the feed gas is at least 75 vol % based on a total volume of the feed gas, and a relative humidity of the feed gas is at least 50% RH, wherein a content of oxygen in the feed gas is less than 1.5 vol % based on a total volume of the feed gas, and wherein the direct barrier discharge system is configured to provide an electric potential between the electrodes to generate a working gas having an ozone content of less than 20 ppm, based on a total volume of the working gas.

27 Claims, 8 Drawing Sheets

(51) Int. Cl.
*B01J 19/08* (2006.01)
*H05H 1/24* (2006.01)

(58) Field of Classification Search
CPC .............. H05H 1/2443; H05H 1/2406; H05H 2245/15; H05H 2245/36; H05H 1/245; A61L 2/14; A61L 2/26; A61L 2202/11; A61L 2202/122; A61L 2202/15; A61L 2202/24; A61L 2/0011; A61L 2202/21; H01J 37/32449; H01J 37/32348; H01J 2237/327; A61B 90/70; C02F 1/4608; C02F 2303/04; A23V 2002/00
See application file for complete search history.

(56) References Cited

U.S. PATENT DOCUMENTS

| | | | |
|---|---|---|---|
| 8,961,894 | B2 | 2/2015 | Keener et al. |
| 9,295,280 | B2 | 3/2016 | Jacofsky et al. |
| 9,363,880 | B2 | 6/2016 | Keener et al. |
| 9,408,930 | B2 | 8/2016 | Keener et al. |
| 9,560,860 | B2 | 2/2017 | Zwijack |
| 9,572,241 | B1 | 2/2017 | Eckert et al. |
| 9,750,833 | B2 | 9/2017 | Keener et al. |
| 9,757,487 | B2 | 9/2017 | Roy et al. |
| 10,194,672 | B2 | 2/2019 | Keener et al. |
| 10,694,887 | B2 | 6/2020 | Deo et al. |
| 10,800,092 | B1 | 10/2020 | Cheng et al. |
| 11,000,045 | B2 | 5/2021 | Keener et al. |
| 11,166,481 | B2 | 11/2021 | Keener et al. |
| 2014/0044595 | A1 | 2/2014 | Keener et al. |
| 2017/0112157 | A1 | 4/2017 | Keener et al. |
| 2019/0033121 | A1 | 1/2019 | Alexander et al. |
| 2019/0290792 | A1* | 9/2019 | Keener ................ C02F 1/4608 |
| 2019/0314535 | A1 | 10/2019 | Golkowski et al. |
| 2020/0163356 | A1 | 5/2020 | Keener et al. |
| 2021/0120848 | A1 | 4/2021 | Keener et al. |
| 2021/0308309 | A1 | 10/2021 | Hochwalt |
| 2022/0001056 | A1 | 1/2022 | Truica-Marasescu |
| 2022/0007690 | A1 | 1/2022 | Keener et al. |

FOREIGN PATENT DOCUMENTS

| | | |
|---|---|---|
| CN | 108412616 A | 8/2018 |
| CN | 109259036 A | 1/2019 |
| CN | 105146237 B | 4/2019 |
| CN | 110708851 A | 1/2020 |
| DK | 2497343 T3 | 2/2017 |
| KR | 20140022624 A | 2/2014 |
| WO | 2017019621 A1 | 2/2017 |
| WO | 2017200930 A1 | 11/2017 |
| WO | WO-2021086863 A1 | 5/2021 |

OTHER PUBLICATIONS

Extended European Search Report for European Application No. 22175009.4, dated Oct. 19, 2022, 11 pages.

Ott, L.C., et al., "High voltage atmospheric cold plasma treatment inactivates Aspergillus flavus spores and deoxynivalenol toxin," Food Microbiology, vol. 95 (2021) 103669, 10 pages.

Sakudo, A., et al., "Disinfection and Sterilization Using Plasma Technology: Fundamentals and Future Perspectives for Biological Applications," International Journal of Molecular Sciences, 2019, vol. 20, 5216, 17 pages.

Fridman, G., et al., "Comparison of Direct and Indirect Effects of Non-Thermal Atmospheric-Pressure Plasma on Bacteria," Plasma Process. Polym., 2007, 4, pp. 370-375.

Snoeckx, R., et al., "CO2 conversion in a dielectric barrier discharge plasma: N2 in the mix as a helping hand or problematic impurity?," Energy Environ. Sci., 2016, 9, pp. 999-1011.

Snoeckx, R., et al., "The Quest for Value-Added Products from Carbon Dioxide and Water in a Dielectric Barrier Discharge: A Chemical Kinetics Study," ChemSusChem, 2017, 10, pp. 409-424.

Final Office Action for U.S. Appl. No. 17/081,837 dated May 28, 2021, 9 pages.

Georgievski, et al., "Qualitative and Quantitative Analysis of Aflatoxins in Raw Peanuts (*Arachis hypogaea* L.)," Journal of Environmental Protection and Ecology, 17(3), pp. 961-969 (2016).

Hird, et al., "Determination of Aflatoxins in a Wide Range of Food and Agricultural Commodities Using Immunoaffinity Chromatography Column Clean-up Coupled with UPLC or HPLC with Fluorescence Detection," Water Corporation, VICAM (Vicam test method), 14 pages, Jun. 2021.

International Preliminary Report on Patentability for International Application No. PCT/US2020/057553 May 12, 2022, 9 pages.

International Search Report and Written Opinion for Application No. PCT/US2020/057553, mailed Feb. 24, 2021, 11 pages.

Non-Final Office Action for U.S. Appl. No. 17/081,837 dated Mar. 24, 2021, 9 pages.

Non-Final Office Action for U.S. Appl. No. 17/486,190 dated Jul. 31, 2023, 8 pages.

Notice of Allowance for U.S. Appl. No. 17/081,837 dated Jun. 28, 2021, 5 pages.

Rozalli, et al., "Quality changes of stabilizer-free natural peanut butter during storage," J Food Sci Technol., Jan. 2016, 53(1), pp. 694-702, doi:10.1007/s13197-015-2006-x.

Final Office Action for U.S. Appl. No. 17/486,190 dated Apr. 1, 2024, 11 pages.

U.S. Appl. No. 62/757,873, titled "Sterilization of plant material", filed Nov. 9, 2018, 17 pages.

* cited by examiner

SYSTEM AND METHOD FOR TREATMENT OF FOOD WITH A GAS

CROSS REFERENCE TO RELATED APPLICATIONS

This application is based on and claims priority to U.S. Provisional Patent Application No. 63/195,415, filed on Jun. 1, 2021, and U.S. Provisional Patent Application No. 63/291,756, filed on Dec. 20, 2021, and all the benefits accruing therefrom under 35 U.S.C. § 119, the contents of which are incorporated by reference herein in their entirety.

BACKGROUND

(1) Field

Disclosed is a system and method for treating food with a gas to reduce contamination.

(2) Description of the Related Art

Food products may be susceptible to contamination from pathogens, microbes, viruses and various toxigenic compounds such as mycotoxins. Treating or sterilizing foods to enhance safety frequently involves the use of chemicals, washing, physical segregation of contaminants, or thermal treatments that may adversely affect the quality of the food. There remains a need for an improved method of reducing pathogens while avoiding degradation from the treatment process to maintain food quality.

SUMMARY

Disclosed is a system for treating a food, the system including: a direct barrier discharge system comprising a pair of electrodes separated by a gap of at least 0.5 cm,
  wherein the direct barrier discharge system is configured to provide a feed gas between the electrodes, wherein the feed gas comprises nitrogen and water, wherein a content of nitrogen in the feed gas is at least 75 vol % based on a total content of the feed gas, a relative humidity of the feed gas is at least 50% RH, wherein a content of $O_2$ in the feed gas is less than 1.5 vol % based on a total content of the feed gas, and
  wherein the direct barrier discharge system is configured to provide an electric potential between the electrodes to generate a working gas having an ozone content of less than 20 ppm, based on a total volume of the working gas.

Also disclosed is a system for treating food, the system including: a direct barrier discharge system including a pair of electrodes separated by a gap of at least 0.5 cm, wherein the direct barrier discharge system is configured to provide a feed gas between the electrodes, wherein the feed gas includes nitrogen and water, and wherein the feed gas has a relative humidity of at least 20% RH, wherein the direct barrier discharge system is configured to provide an electric potential between the electrodes to generate a working gas having an ozone content of less than 4000 ppm, and wherein the electrode area to chamber volume is greater than 0.005 per centimeter gap.

Also disclosed is a method of treating food, the method comprising: providing a direct barrier discharge system comprising a pair of electrodes separated by a gap of at least 0.5 cm; disposing a feed gas between the electrodes, wherein the feed gas includes nitrogen and water, wherein a content of $O_2$ in the feed gas is less than 1.5 vol %, a content of $N_2$ in the feed gas is greater than 75 vol %, and wherein a content of the water in the feed gas is at least 50% RH, each based on a total content of the feed gas; disposing an untreated food between the electrodes, providing an electric potential between the electrodes to generate a working gas having an ozone content of less than 20 ppm; and contacting the food with the working gas to treat the food and provide a treated food.

Also disclosed is a method of treating food, the method including: providing a direct barrier discharge system including a pair of electrodes separated by a gap of at least 0.5 cm; disposing a feed gas between the electrodes, wherein the feed gas includes nitrogen and water, wherein a content of the water is at least 20% RH; disposing an untreated food between the electrodes; providing an electric potential between the electrodes to generate a working gas having an ozone content of less than 4000 ppm; and contacting the food with the working gas to treat the food and provide a treated food.

BRIEF DESCRIPTION OF THE DRAWINGS

The following figures are exemplary embodiments wherein the like elements are numbered alike, in which.

DETAILED DESCRIPTION

Dielectric barrier discharge (DBD) is a non-thermal food decontamination methodology that utilizes a high voltage, e.g., 20 to 500 kilovolts (kV), and an operating frequency between 50 Hertz (Hz) and 500 kiloHertz (kHz), applied between two electrodes separated by a dielectric layer and a discharge gap. Application of high voltage results in the generation of free electrons that interact with a feed gas to produce a working gas comprising reactive gas species (RGS). The reactive gas species may be metastable, and may comprise, radicals, positive ions, negative ions, as well as electromagnetic emissions. The RGS can breakdown microorganisms and toxins on food surfaces or inside foods on relatively very short timescales and avoid a significant temperature increase or a chemical residue, e.g., as may occur if a chemical decontamination method is used. However, despite the advantages of dielectric barrier discharge (DBD) as a food decontamination technology, because of processes such as lipid oxidation, its impact on food quality poses a significant challenge.

The concentration and speciation of the RGS generated during discharge depends on the applied voltage, reactor geometry, and the feed gas composition. When air is used as a feed gas in a food disinfection DBD system, the RGS generated include ozone ($O_3$), $NO_2$, $HNO_3$, $H_2O_2$, and hydroxyl radicals (—OH).

Ozone ($O_3$) has a disinfectant effect and has a relatively long half-life, e.g., a half-life which is greater than other RGS generated, e.g., $NO_2$, $HNO_3$, $H_2O_2$, or —OH. Also, ozone is understood to degrade proteins and lipids in foods, and food packaging materials, resulting in reduced food quality. For example, $O_3$ is understood to cause lipid oxidation, creating alcohols and aldehydes. While not wanting to be bound by theory, it is understood that the products of ozone oxidation, e.g., alcohols and aldehydes, adversely affect food quality, degrading aroma and taste. Also, ozone oxidation can result in reduced shelf life and loss of nutrients. The reduced food quality is understood to result from increased peroxide and acid values resulting from ozonation. Thus while DBD treatment using air as a feed gas can provide desirable decontamination, undesirable effects result, making DBD treatment using ambient air as a feed gas a less viable food disinfection method.

The inventors have surprisingly discovered that by using a selected gas composition generation of $O_3$ can be suppressed and a working gas comprising suitable Reactive Gas Species (RGS) with half-lives shorter than ozone can be provided. The inventors have also surprisingly discovered that by using a ratio of electrode area to chamber volume greater than $0.005$ $cm^{-1}$, a broader range of feed gas compositions can be used to provide a working gas comprising suitable RGS.

Treating food with a DBD using the prescribed conditions or the disclosed working gas results in significant mitigation of the adverse effects on food quality observed when DBD treatment using air as a feed gas is used, resulting in suitable bacterial or toxin reduction while avoiding undesirable oxidation effects. While not wanting to be bound by theory, it is understood that by avoiding $O_3$ in the working gas protein degradation, lipid oxidation, discoloration, or food softening, is avoided, preserving food quality.

While not wanting to be bound by theory, it is understood that the reactions generating the RGS that occur include Reactions 1 to 8, where M is a neutral species, such as $CO_2$, CO, $N_2$, $O_2$, or a combination thereof.

$$e^- + CO_2 \rightarrow CO + O + e^- \quad (1)$$

$$e^- + H_2O \rightarrow OH + H + e^- \quad (2)$$

$$OH + O \rightarrow H + O_2 \quad (3)$$

$$H + O_2 + M \rightarrow HO_2 + M \quad (4)$$

$$OH + O \rightarrow H + O_2 \quad (6)$$

$$H + O_2 + M \rightarrow HO_2 + M \quad (7)$$

$$HO_2 + HO_2 \rightarrow H_2O_2 + O_2 + M \quad (8)$$

It is understood that use of a humidified feed gas or avoiding $O_2$ in the feed gas restricts $O_3$ formation pathways.

The disclosed system and feed gas formulation are understood to shift the RGS generated from ozone to alternative RGS, such as $NO_2$, $HNO_3$, —OH, or $H_{22}O_2$. In further detail, the prescribed conditions provide RGS other than ozone, e.g., $NO_2$ or $HNO_3$, and these RGS are understood to provide suitable decontamination by toxin degradation or pathogen destruction, and these non-ozone RGS species have less adverse effect on food quality than $O_3$, or do not adversely affect food quality.

The desired RGS, such as OH, $H_2O_2$, $HO_2^-$, or reactive nitrogen species such as $NO_2$ or $HNO_3$, are understood to have shorter residence times than $O_3$. Accordingly, proximity to the plasma field can be used to select for the desired RGS. Thus in the disclosed system and method, treatment of the food is conducted within the plasma field (i.e., in-field), e.g., within the discharge gap, and transport of the reactive species to a secondary location is avoided. Treatment of food between the electrodes is mentioned. Further, the desired RGS can be promoted and ozone avoided by avoiding oxygen in the feed gas, including in the feed gas a singlet oxygen source such as $CO_2$, using a voltage of at least 20 kV, increasing the humidity of the feed gas, or increasing a ratio of the electrode area to chamber volume. Each of these features may be used independently or in combination.

Another aspect includes surface functionalization or etching of food surfaces using an ion shower generated during discharge. While not wanting to be bound by theory, it is understood that during discharge, ions generated may provide an etching effect. The ions are understood to remove a portion of the surface and any contaminants that may adhere to the surface. Similarly, a chemical reaction between the RGS and food surface may generate a chemical intermediate, which can facilitate removal of the contaminant. Such mechanical etching or chemical etching can further improve food disinfection and toxin removal to provide improved toxin degradation and pathogen destruction while preserving food quality.

Figure 1:
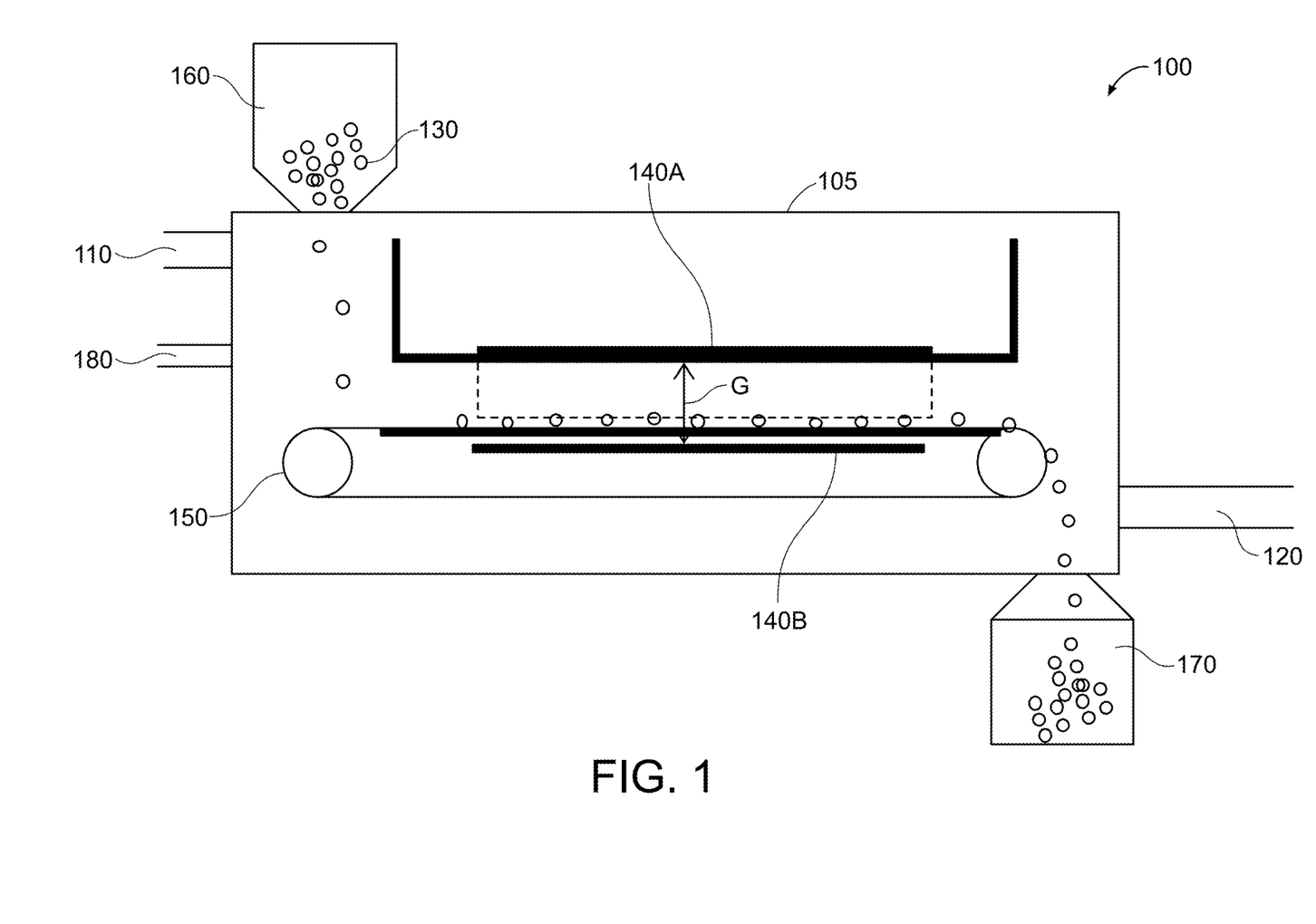
FIG. 1 is a schematic diagram of an embodiment of a dielectric barrier discharge (DBD) system.

The DBD 100 is shown schematically in FIG. 1, and includes a chamber 105 having a feed gas inlet 110 and feed gas outlet 120. The food 130 to be treated is disposed between electrodes, comprising a high voltage electrode 140A and a ground 140B, which are separated by a gap G. The gap G between the electrodes may be 0.5 centimeters (cm), 1 cm, 1.5 cm, 2 cm, or 3 cm to 4 cm, 8 cm, 12 cm, 15 cm or 20 cm. Also shown is a conveyor 150, an inlet hopper 160 and outlet hopper 170. In operation, a working gas comprising the RGS is generated between the electrodes 140, and in proximity to the food 130. Because of the relatively short half-lives of the RGS, generation of the RGS in proximity to the food 130 provides decontamination that is understood to not be possible if the RGS were to be generated other than in proximity to the food. Additional details of the DBD system are disclosed in U.S. Pat. No. 11,166,481, the content of which is incorporated herein by reference in its entirety.

In an aspect use of a feed gas comprising nitrogen and water is disclosed. The feed gas may have a nitrogen ($N_2$) content of at least 75 volume percent (vol %), e.g., 75 vol %, 77 vol %, 79 vol %, or 80 vol % to 82 vol %, 85 vol %, 90 vol %, or 95 vol %, or 98 vol %, based on a total volume of the feed gas. The relative humidity of the feed gas may be at least 50% RH, e.g., 50% RH, 55% RH, 60% RH, or 65% RH to 70% RH, 75% RH, 80% RH, or 90% RH. The feed gas may be humidified by an external humidifier to provide the desired humidity. Alternatively, or in addition, the DBD may be provided with an additional inlet to add humidity directly to the DBD, e.g., through a steam inlet 180. Use of the steam inlet 180 may provide improved humidity control, resulting in reduced ozone generation, or ability to accommodate $O_2$ in the feed gas.

In an aspect the oxygen content of the feed gas is less than 1.5 vol % based on a total volume of the feed gas, e.g., 0.001 vol %, 0.01 vol %, or 0.1 vol % to 0.2 vol %, 0.5 vol %, 1 vol %, or 1.5 vol %, based on a total volume of the feed gas.

The DBD may be configured to provide a potential of 20 kilovolts (kV), 25 kV, 30 kV, 35 kV or 40 kV to 80 kV, 90 kV, 100 kV, or 120 kV between the electrodes 140. The potential between the electrodes may be at least 30 kV per centimeter gap between the electrodes. In an aspect, the potential between the electrodes may be 30 kV, 40 kV, or 50 kV to 60 kV, 75 kV, or 100 kV per centimeter gap. The DBD may be configured to operate at any suitable frequency, 30 Hertz (Hz), 40 Hz, or 50 Hz to 60 Hz, 70 Hz, or 120 Hz. In an aspect, the DBD is configured to generate a working gas having an ozone content of less than 20 parts per million (ppm), e.g., 0.01 ppm, 0.1 ppm, 1 ppm, or 2 ppm to 5 ppm, 10 ppm, or 20 ppm.

The inventors have further determined that use of a ratio of an electrode area to chamber volume of at least 0.005 $cm^{-1}$ provides further protection from food quality degradation by ozone. While not wanting to be bound by theory, it is understood that use of the ratio of the electrode area to chamber volume of at least 0.005 $cm^{-1}$ enhances the reaction of $O_3$ and $N_2$ to form $NO_x$ species, e.g., $NO_2$ or $N_2O_2$, effectively reducing the ozone content. The ratio an electrode area to chamber volume may be 0.005 $cm^{-1}$, 0.01 $cm^{-1}$, 0.05 $cm^{-1}$, or 0.1 $cm^{-1}$, to 0.5 $cm^{-1}$, 1 $cm^{-1}$, 5 $cm^{-1}$, or 10 $cm^{-1}$, based on the total electrode area and total volume of the DBD chamber. Use of a ratio of electrode area to chamber volume of 0.009 $cm^{-1}$, 0.01 $cm^{-1}$, 0.02 $cm^{-1}$, or 0.03 $cm^{-1}$ to 0.2 $cm^{-1}$, 0.5 $cm^{-1}$, 1 $cm^{-1}$, or 2 $cm^{-1}$, based on the total electrode area and total volume of the DBD chamber e.g., 0.006 $cm^{-1}$ to 0.01 $cm^{-1}$, is mentioned.

In an aspect, use of an electrode area to chamber volume of at least 0.005 $cm^{-1}$ can be used to provide a suitable working gas, e.g., a working gas having an ozone content of less than 4000 ppm, from a feed gas having a relative humidity of at least 20% RH, e.g., 20% RH, 25% RH, 30% RH, or 35% RH to 40% RH, 50% RH, 75% RH, or 99.9% RH. In an aspect, the working gas, formed by discharge on the feed gas, has an ozone content of 1 ppm, 10 ppm, 50 ppm, 100 ppm, 200 ppm or 300 ppm to 1000 ppm, 1500 ppm, 2000 ppm, 2500 ppm, 3000 ppm, or 4000 ppm.

In an aspect an oxygen content of the feed gas may by less than 3 vol %, based on a total volume of the feed gas. In an aspect, the oxygen content of the feed gas may be 10 parts per million (ppm), 100 ppm, 0.001 vol %, 0.01 vol %, or 0.1 vol % to 0.5 vol %, 1 vol %, 2 vol %, or 3 vol %, based on a total volume of the feed gas.

Also disclosed is use of a feed gas comprising a gas other than oxygen that can also supply singlet oxygen ions, e.g., $CO_2$, $SO_2$, or $NO_2$. The feed gas may have a content of $CO_2$, or $SO_2$ contained in an amount of greater 0 vol %, 0.1 vol %, 0.5 vol % or 1 vol % to 2 vol %, 5 vol %, 10 vol %, 20 vol %, or 30 vol %, based on a total volume of the feed gas. Use of carbon dioxide ($CO_2$) in amount of 20 vol %, based on a total volume of the feed gas, is mentioned.

In an aspect, the feed gas may have a $CO_2$, $SO_2$, or $NO_2$ content of at least 20 vol %, e.g., 20 vol %, 25 vol %, or 30 vol % to 40 vol %, 50 vol %, 60 vol % or 99 vol %, based on a total volume of the feed gas. Mentioned is an aspect where the ratio of the electrode area to chamber volume is greater than 0.005 $cm^{-1}$, and the feed gas comprises carbon dioxide, and the content of carbon dioxide is at least 20 vol %, e.g., 20 vol %, 25 vol %, or 30 vol % to 40 vol %, 45 vol %, 50 vol % or 55 vol %, based on a total volume of the feed gas. In an aspect the feed gas comprises nitrogen, oxygen, and carbon dioxide, and the content of carbon dioxide in the feed gas is 20 vol %, 25 vol %, or 30 vol % to 35 vol %, 40 vol %, or 50 vol %, based on a total volume of the nitrogen, the oxygen, and the carbon dioxide in the feed gas. Use of 5 vol % to 20 vol % carbon dioxide, based on a total volume of the nitrogen, the oxygen, and the carbon dioxide in the feed gas is mentioned.

In an aspect, use of a feed gas comprising $N_2$, $CO_2$, or a combination thereof, at a relative humidity of 40% RH to 99% RH is disclosed. The content of $N_2$ can be 0 to 99 volume percent (vol %), and the content of $CO_2$ can be 0 to 75 vol %, based on a total volume of the feed gas. In an aspect, and the content of $O_2$ can be 21 vol %, based on a total volume of the feed gas.

In an aspect, the feed gas includes $N_2$ and $O_2$, and has a humidity of 20% RH to 100% RH. The $N_2$ content can be 50 vol %, 60 vol %, 70 vol %, or 80 vol % to 90 vol %, 95 vol %, 99 vol %, or 99.9 vol %, based on a total volume of the feed gas. The $O_2$ content can be 0.01 vol %, 0.1 vol %, 0.5 vol % or 1 vol % to 10 vol %, 15 vol %, 20 vol %, or 21 vol %, based on a total volume of the feed gas. The relative humidity of the feed gas can be 40% RH, 45% RH, or 50% RH to 80% RH, 90% RH, 95% RH, or 100% RH. While not wanting to be bound by theory, use of 20% RH to 100% RH, e.g., 50% RH to 95% RH, suppresses the generation of $O_3$. The disinfection rate is surprisingly comparable to when $O_3$ is present, and minimal degradation of food quality occurs. Thus use of a feed gas comprising $N_2$ and $O_2$, and a humidity of 20% RH to 100% RH can provide an unexpected improvement when disinfection and food quality are considered in combination.

The feed gas may further comprise a noble gas, i.e., a Group 18 element, e.g., He, Ne, Ar, Kr, Xe, or a combination thereof, in a content of 0.1 vol %, 0.2 vol %, 0.4 vol %, or 1 vol % to 15 vol %, 30 vol %, 40 vol %, or 50 vol %, based on a total volume of the feed gas. While not wanting to be bound by theory, including the noble gas provides improved discharge characteristics by allowing higher discharge current and improved high energy streamer generation resulting in improved RGS generation, thus increasing the number density of reactive radicals in the vicinity of the food being treated.

In an aspect, the feed gas comprises $N_2$, and $O_2$ is excluded, and the feed gas can have a humidity of greater than 0 to 99% RH. The $N_2$ content can be 60 vol %, 70 vol %, or 80 vol % to 99 vol %, 99.9 vol %, or 100 vol %, based on a total volume of the feed gas, $O_2$ is excluded, and the relative humidity of the feed gas can be 50% RH to 80% RH to 95% RH, or 100% RH. Optionally the feed gas may further comprise 0.1 vol % to 50 vol % of a noble gas. While not wanting to be bound by theory, it is understood that when $O_2$ is excluded, oxidizing RGS generated include $HO_2^-$ and —OH, generation of other RGS does not occur, and disinfection is provided by an etching effect in which the ions generated erode the surface of the food, degrading or removing any contaminants present. When $O_2$ is excluded, some adventitious oxygen may be present, and the $O_2$ content may be 1 ppm, 10 ppm, 50 ppm, or 100 ppm to 200 ppm, 500 ppm, or 1000 ppm, based on a total volume of the feed gas.

A benefit of the disclosed system and method is that it provides an improved combination of disinfection and food quality. Disinfection may be determined by analysis to show reduction in aflatoxin content upon treatment. Analysis for aflatoxin can be as described in Georgievski, B., Kostik, V., et. al., "Qualitative and Quantitative Analysis of Aflatoxins in Raw Peanuts," Journal of Environmental Protection and Ecology, 17, No 3, 961-969 (2016), or Simon Hird, Kimberly Martin, Nancy Zabe Collette, Danrey Toth, "Determination of Aflatoxins in a Wide Range of Food and Agricultural Commodities Using Immunoaffinity Chromatography Column Clean-up Coupled with UPLC or HPLC with Fluorescence Detection (Vicam test method)," the contents of both of which are incorporated herein by reference in their entirety.

A content of aflatoxin of a treated food may be 0%, 1%, 2%, or 5% to 10%, 20%, 30%, 40% or 50% of an aflatoxin content of an untreated food. Reduction in food quality is understood to occur from lipid oxidation. Lipid oxidation can be determined by sensory methods, e.g., using a sensory panel. Alternatively, peroxide content is understood to correlate with lipid oxidation, and thus a peroxide value of the treated food can be a useful measure of quality. Analysis for peroxide can be as provided in Mohd Rozalli N H, Chin N L, Yusof Y A, and Mahyudin N., "Quality changes of stabilizer-free natural peanut butter during storage," J Food Sci Technol. 2016; 53(1):694-702, doi:10.1007/s13197-015-2006-x, the content of which is incorporated herein by reference in its entirety. In an aspect, the treated food has a peroxide value of less than 10 milliequivalents per kilogram (meq/kg), 0 meq/kg, 0.1 meq/kg, 0.2 meq/kg, or 0.4 meq/kg to 2 meq/kg, 4 meq/kg, 8 meq/kg, or 10 meq/kg.

Benefits of the disclosed system and method include reducing or eliminating toxins and pathogens, while maintaining various aspects of food quality, including avoiding undesirable protein degradation, lipid oxidation, discoloration, or softening, for example. For some foods, benefits include avoiding lipid oxidation which results in undesirable sensory effects, e.g. a rancid odor that can occur from ozone oxidation of lipids on peanuts, for example. Undesirable discoloration can also be avoided, such as ozone driven discoloration of cheese. Undesirable softening can also be avoided, such as ozone driven softening of fruits, e.g., tomatoes.

In an aspect, disclosed is a system for treating a food, the system comprising: a direct barrier discharge system comprising a pair of electrodes separated by a gap of at least 0.5 cm, wherein the direct barrier discharge system is configured to provide a feed gas between the electrodes, wherein the feed gas comprises nitrogen and water, wherein a content of nitrogen in the feed gas is at least 75 vol % based on a total content of the feed gas, and a relative humidity of the feed gas is at least 50% RH, wherein a content of oxygen in the feed gas is less than 1.5 vol % based on a total content of the feed gas, and wherein the direct barrier discharge system is configured to provide an electric potential between the electrodes to generate a working gas having an ozone content of less than 20 ppm, based on a total volume of the working gas.

Also disclosed is a system for treating food, the system comprising: a direct barrier discharge system comprising a pair of electrodes separated by a gap of at least 0.5 cm, wherein a ratio of the electrode area to chamber volume is greater than 0.005 cm$^{-1}$, wherein the direct barrier discharge system is configured to provide a feed gas between the electrodes, wherein the feed gas comprises nitrogen and water, and wherein the feed gas has a relative humidity of at least 20% RH, and wherein the direct barrier discharge system is configured to provide an electric potential between the electrodes to generate a working gas having an ozone content of less than 4000 ppm.

Also disclosed is a method of treating food, the method comprising: providing a direct barrier discharge system comprising a pair of electrodes separated by a gap of at least 0.5 cm; disposing a feed gas between the electrodes, wherein the feed gas comprises nitrogen and water, wherein a content of nitrogen in the feed gas is at least 75 vol % based on a total content of the feed gas, and a relative humidity of the feed gas is at least 50% RH, and wherein a content of $O_2$ in the feed gas is less than 1.5 vol % based on a total content of the feed gas; disposing an untreated food between the electrodes; providing an electric potential between the electrodes to generate a working gas having an ozone content of less than 20 ppm, based on a total volume of the working gas; and contacting the food with the working gas to treat the food and provide a treated food.

Also disclosed is a method of treating food, the method comprising: providing a direct barrier discharge system comprising a pair of electrodes separated by a gap of at least 0.5 cm, and wherein a ratio of the electrode area to chamber volume is greater than 0.005 cm$^{-1}$; disposing a feed gas between the electrodes, wherein the feed gas comprises nitrogen and water, wherein the feed gas has a relative humidity of at least 20% RH; disposing an untreated food between the electrodes; providing an electric potential between the electrodes to generate a working gas having an ozone content of less than 4000 ppm, based on a total volume of the working gas; and contacting the food with the working gas to treat the food and provide a treated food.

In any of the above aspects, a ratio of the electrode area to chamber volume may be greater than 0.005 cm$^{-1}$, the direct barrier discharge system may be configured to provide an electric potential of at least 30 kV per centimeter gap between the electrodes; a content of the carbon dioxide in the feed gas may be 0 vol % to 30 vol %, based on a total volume of the feed gas; the system may further comprise a food between the electrodes; the gap may be 0.5 cm to 4 cm; an oxygen content of the feed gas may be less than 3 vol %, based on a total volume of the feed gas; the oxygen content of the feed gas may be 100 ppm to 3 vol %, based on a total volume of the feed gas; the direct barrier discharge system may be configured to provide an electric potential of 30 kV to 120 kV between the electrodes; the direct barrier discharge system may be configured to provide an electric potential of at least 30 kV per centimeter gap between the electrodes; the feed gas may further comprises carbon dioxide; a content of carbon dioxide in the feed gas may be at least 20 vol %, based on a total volume of the feed gas; a content of the carbon dioxide in the feed gas may be 20 vol % to 99 vol %, based on a total volume of the feed gas; a content of the carbon dioxide in the feed gas may be 25 vol % to 35 vol %, based on a total volume of the nitrogen, the oxygen, and the carbon dioxide in the feed gas; an oxygen content of the feed gas may be less than 3 vol %, based on a total volume of the feed gas; a relative humidity of the feed gas may be 30% RH to 70% RH; the feed gas may further comprises carbon dioxide, and a content of carbon dioxide in the feed gas may be at least 20 vol %, based on a total volume of the feed gas; the treated food may have a peroxide value of less than 0.2 meq/kg; or a content of aflatoxin of the treated food may be less than 50% of a content of aflatoxin of the untreated food.

This disclosure is further illustrated by the following examples, which are non-limiting.

EXAMPLES

In each of Comparative Example 1, and Examples 1 to 9, the DBD apparatus used is schematically shown in FIG. 1.

Additional details of the DBD are further disclosed in U.S. application Ser. No. 17/081,837, the content of which is incorporated herein by reference in its entirety, with changes as noted herein.

Comparative Example 1

Air

Figure 2:
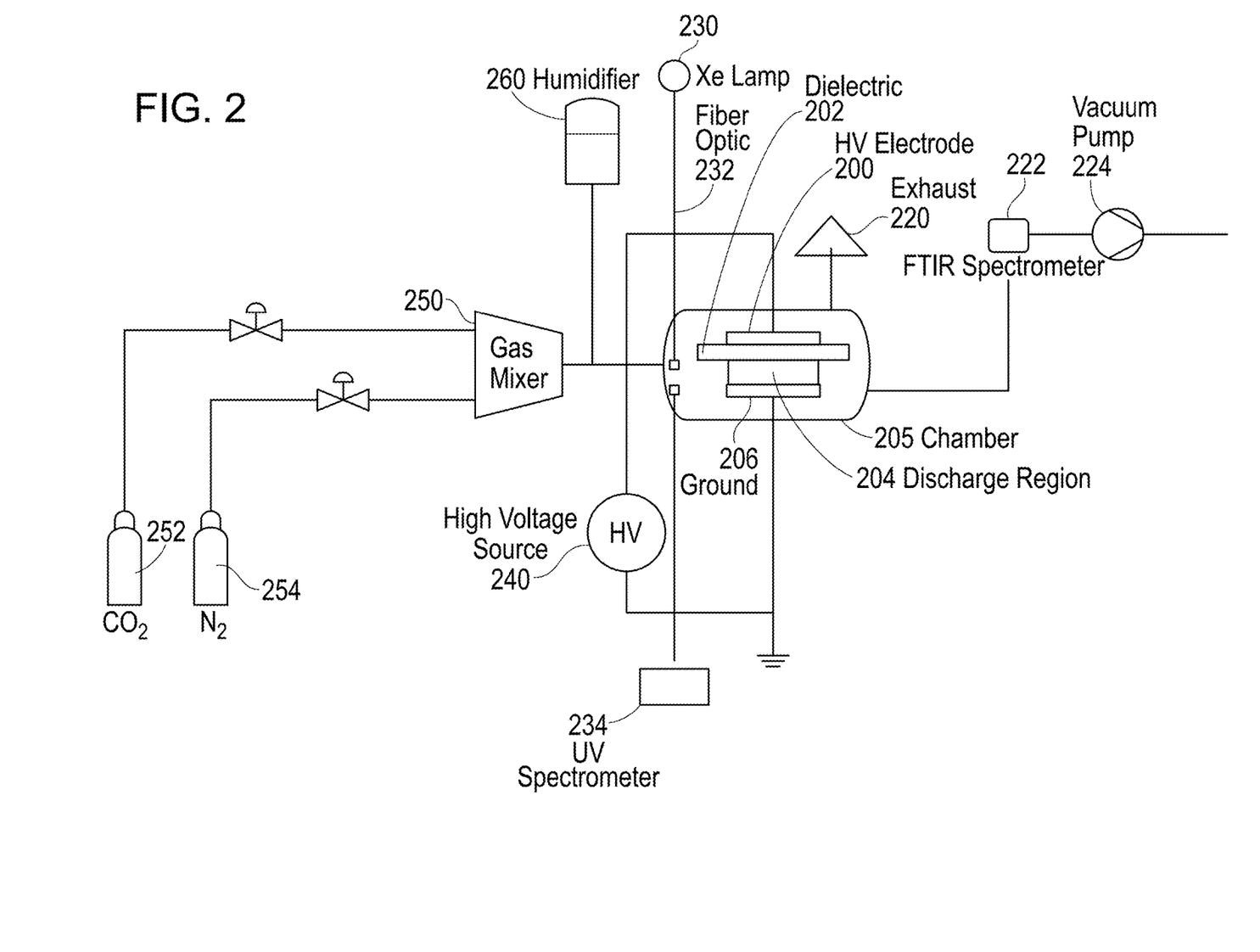
FIG. 2 is a schematic diagram of the DBD used in Comparative Example 1 and Examples 1 to 9.

The apparatus shown schematically in FIG. 2 was used. The dielectric material was glass, and aluminum electrodes were used with a 2 cm gap. The working gas was sampled from the chamber opposite the feed gas inlet and analyzed by Fourier Transform Infrared Spectroscopy (FTIR), as shown in FIG. 2. The DBD includes a chamber 205. The high voltage (HV) electrode 200 is above the dielectric 202, leaving space for a discharge region 204 above the ground 206. The dielectric 202 is plate glass. Also provided is an exhaust 220. The working gas was analyzed by a FTIR spectrometer 222 connected to the chamber. Also provided for UV analysis is a Xe Lamp 230 and UV spectrometer 234, each connected to the chamber by fiber optic cable 232. Also provided is a high voltage source 240, connected to the HV electrode 200 and ground 206. The feed gas is provided by a gas mixer 250 connected to gas supply, such as $CO_2$ tank 252 or $N_2$ tank 254. The feed gas can be humidified by humidifier 260 before delivery to into the chamber. In the FTIR analysis, absorbances corresponding to water were removed to permit quantification of other species. An alternating current (AC) voltage of 45 kilovolts at 60 Hertz (Hz) was used at 18° C. Humidity was determined by placing a humidity sensor within the DBD chamber.

Peanuts were inoculated by contacting with aflatoxin B1 ($AFB_1$) in methanol (6 milligrams $AFB_1$ per kilogram methanol).

Figure 3:
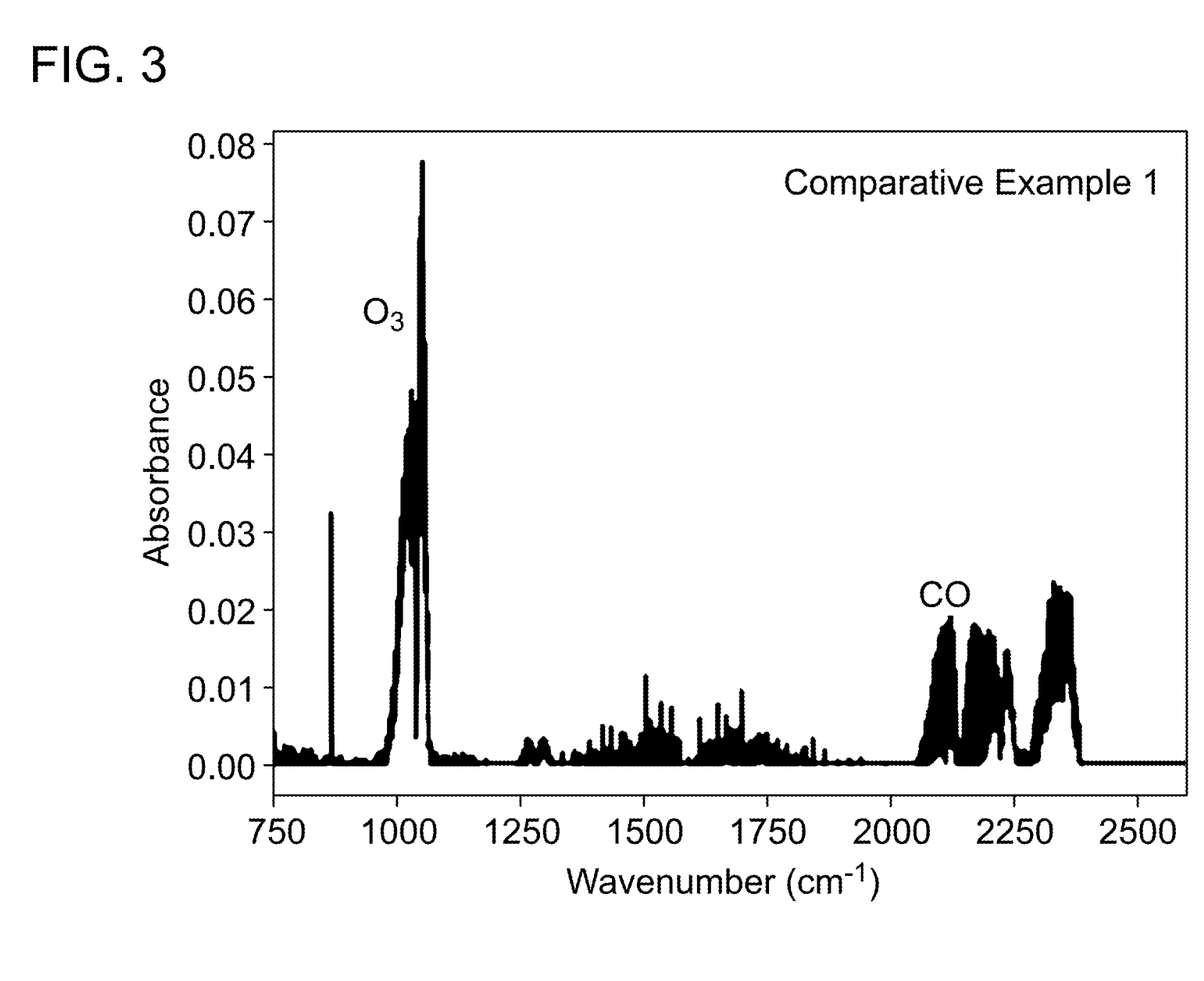
FIG. 3 is a graph of absorbance (arbitrary units, a.u.) versus wavenumber ($cm^{-1}$) and shows the results of the FTIR analysis of the working gas from Comparative Example 1.

Two petri dishes, each containing 50 grams (g) of inoculated peanuts were placed in the chamber. The chamber was open to the ambient air, having a relative humidity of 30% RH. The peanuts were treated for 6 minutes. During the treatment the gas was sampled and analyzed by FTIR every 30 seconds to quantify the Reactive Gas Species (RGS) generated. The results shown in FIG. 3 are representative. FTIR Analysis found that the RGS contained 4000 parts per million (ppm) ozone. In addition, absorbances corresponding to CO and $CO_2$ are observed. Absorbances for $HNO_3$ and $NO_2$, if present, could not be distinguished from $H_2O$.

Examples 1 to 7

The apparatus and methods of Comparative Example 1 were used, with the exception that the DBD electrodes were within a sealed chamber having a volume of 0.1 cubic meters ($m^3$), and a feed gas having a composition as provided in Table 1 used at a flow rate of 1 cubic meter per minute ($m^3$/min).

Figure 4:
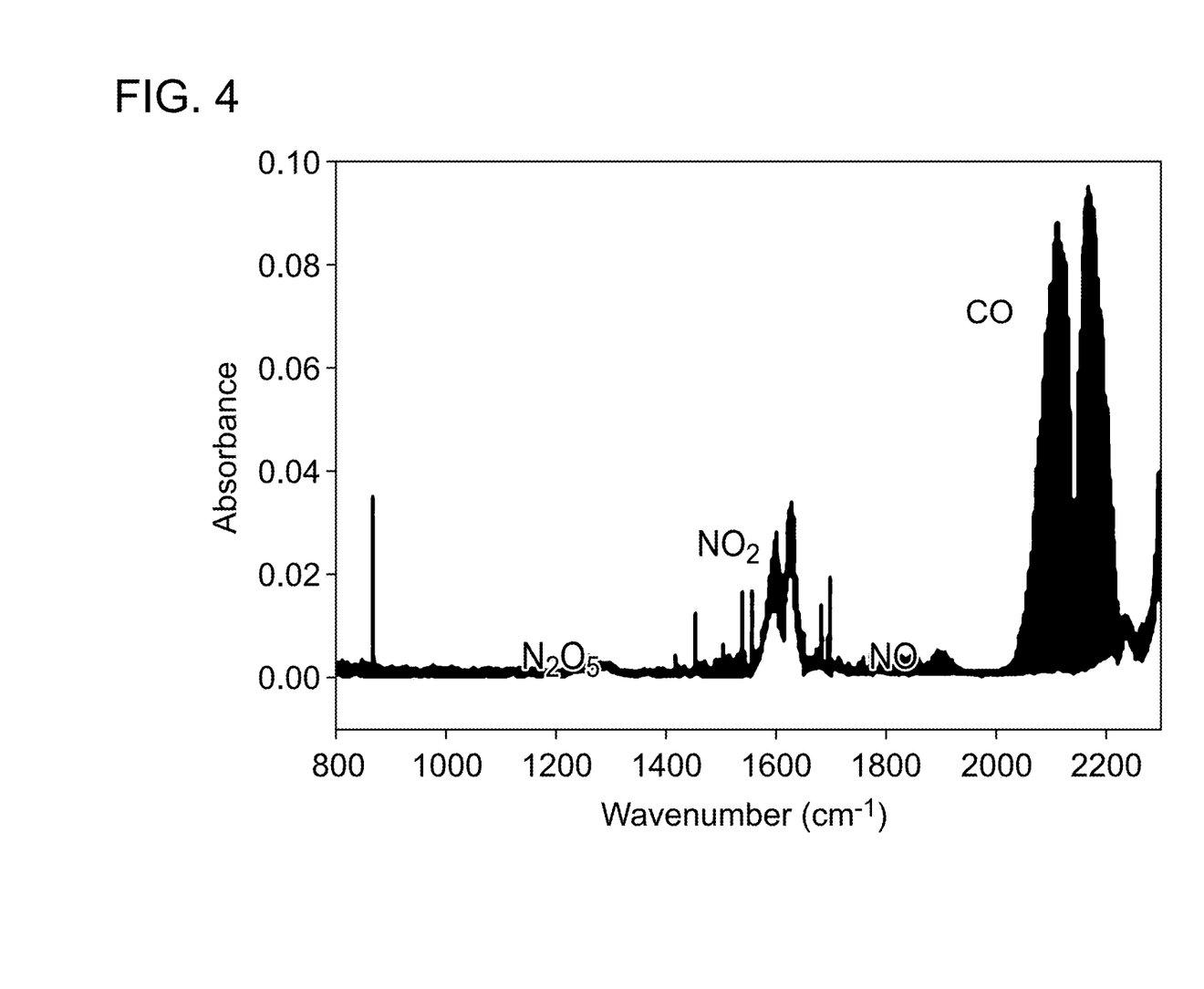
FIG. 4 is a graph of absorbance (arbitrary units, a.u.) versus wavenumber ($cm^{-1}$) and shows the results of the FTIR analysis of the working gas from Example 7.

As in Comparative Example 1, the RGS were determined by FTIR. The FTIR results for Example 7 are representative and shown in FIG. 4. In FIG. 4, absorbances from $H_2O$ are removed by subtraction. As shown, ozone is not detected, and CO, NO, $NO_2$, and $N_2O_2$ are observed.

$AFB_1$ Analysis

The $AFB_1$ content of untreated and treated peanuts were determined by analysis for aflatoxin. The results are summarized in Table 1.

Sensory Analysis

Lipid oxidation was determined by sensory analysis. In the sensory analysis, a trained panel was provided a dish of the treated peanuts and asked to gauge the treated peanuts as acceptable or not acceptable. The results of the sensory analysis are included in Table 1.

TABLE 1

| | | $N_2$ (vol %) | $O_2$ (vol %) | $CO_2$ (vol %) | % RH | $O_3$ ppm | $NO_2$ ppm | PV (meq/kg) | $AFB_1$ reduction (%) | Difference from control | Sensory | $AFB_1$ and Sensory |
|---|---|---|---|---|---|---|---|---|---|---|---|---|
| | | | | | 45 kV, 60 Hz | | | | | | | |
| CEx 1 | Air | 78 | 21 | 0.04 | 30 | 4000 | 40 | 1.2 | 49 | 7.6 | Fail | No |
| Ex 1 | | 100 | 0 | 0 | 65 | <10 | <5 | <0.2 | 20 | 2.7 | Pass | Yes |
| Ex 2 | | 97 | 3 | 0 | 65 | <10 | 35 | <0.2 | 51.6 | 6.4 | Fail | Yes |
| Ex 3 | | 100 | 0 | 0 | 25 | <10 | 35 | <0.2 | 20 | 2.7 | Pass | Yes |
| Ex 4 | | 99 | 1 | 0 | 65 | <10 | 35 | <0.2 | 48 | 3.8 | Pass | Yes |
| Ex 5 | | 74.6 | 1.2 | 24 | 30 | <10 | 35 | <0.2 | NA | 3.4 | Pass | NA |
| Ex 6 | | 72 | 2.4 | 25.5 | 65 | <10 | 35 | <0.2 | 48.5 | 4.2 | Pass | Yes |
| Ex 7 | | 74.6 | 1.2 | 24 | 65 | <10 | 35 | 0.3 | 50 | 2.5 | Pass | Yes |
| Ex 8 | | 69.3 | 9.8 | 20.9 | 65 | 1000 | 35 | 0.6 | 48.8 | NA | Fail | No |
| Ex 9 | | 64.3 | 14.8 | 19.7 | 65 | 2000 | 35 | 1.2 | 47 | NA | Fail | No |

NA = Not available (not determined)

For CEx 1 and Ex 1 to 9, as shown in Table 1, vol % is based on a total volume of $N_2$, $O_2$, and $CO_2$.

Ratio of Electrode Area to Chamber Volume

Example 10

Ratio of Electrode Area to Chamber Volume of 0.009

Figure 5:
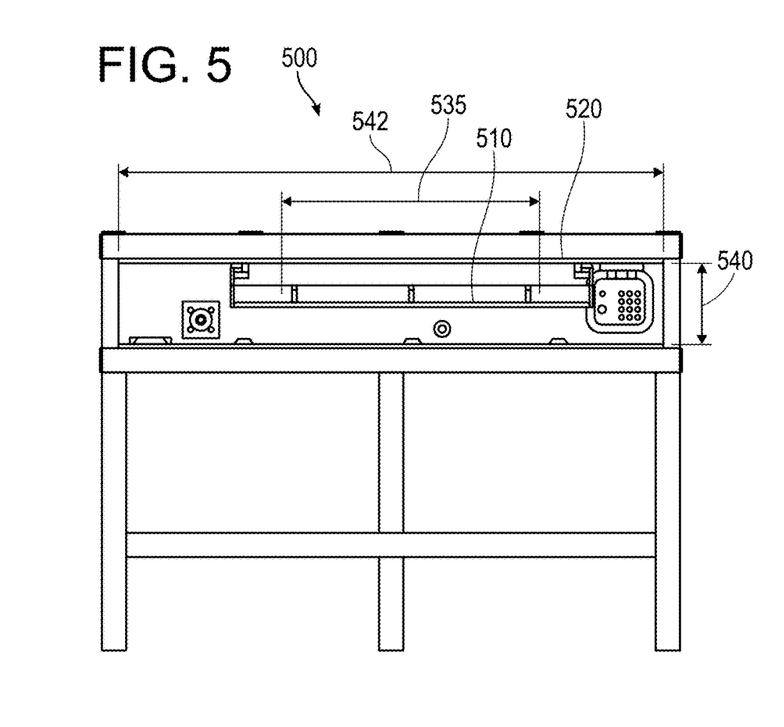
FIG. 5 is a schematic diagram showing an elevation view of an embodiment of a DBD having a planar electrode.
Figure 6:
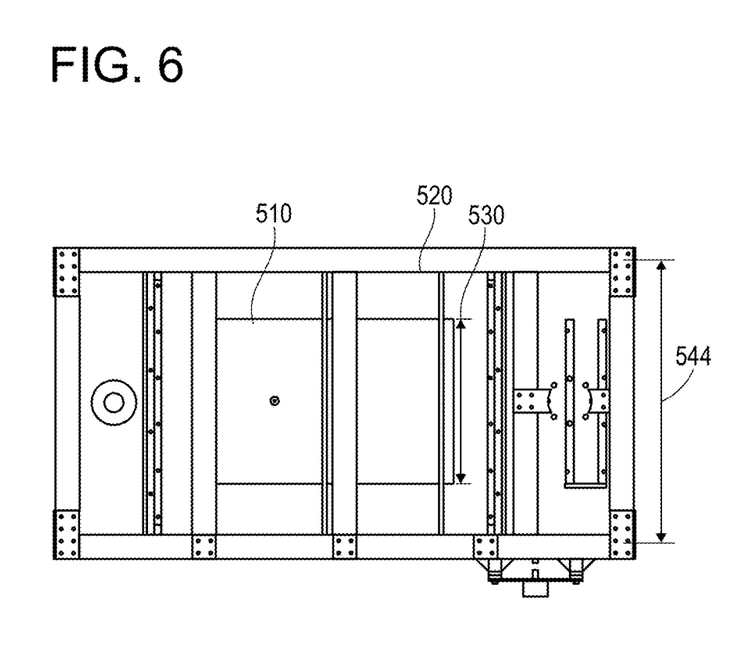
FIG. 6 is a plan view of the DBD shown in FIG. 5.

A DBD 500 having a planar electrode 510 with a width 530 of 53.4 cm and a length 535 of 80 cm, thus an area of 4272 $cm^2$, in a chamber 520 with a height 540 of 26.7 cm, a length 542 of 196 cm, and a width 544 of 92 cm, thus a volume of 481454 $cm^3$ was used, as shown in FIGS. 5 and 6. The feed gas was air having a relative humidity of 30% RH. The ratio of electrode area (4272 $cm^2$) to chamber volume (481454 $cm^3$) was 0.009 $cm^{-1}$. The ozone concentration was determined by FTIR analysis, the working gas was sampled from the chamber and near the discharge region as shown in FIG. 2.

Figure 7:
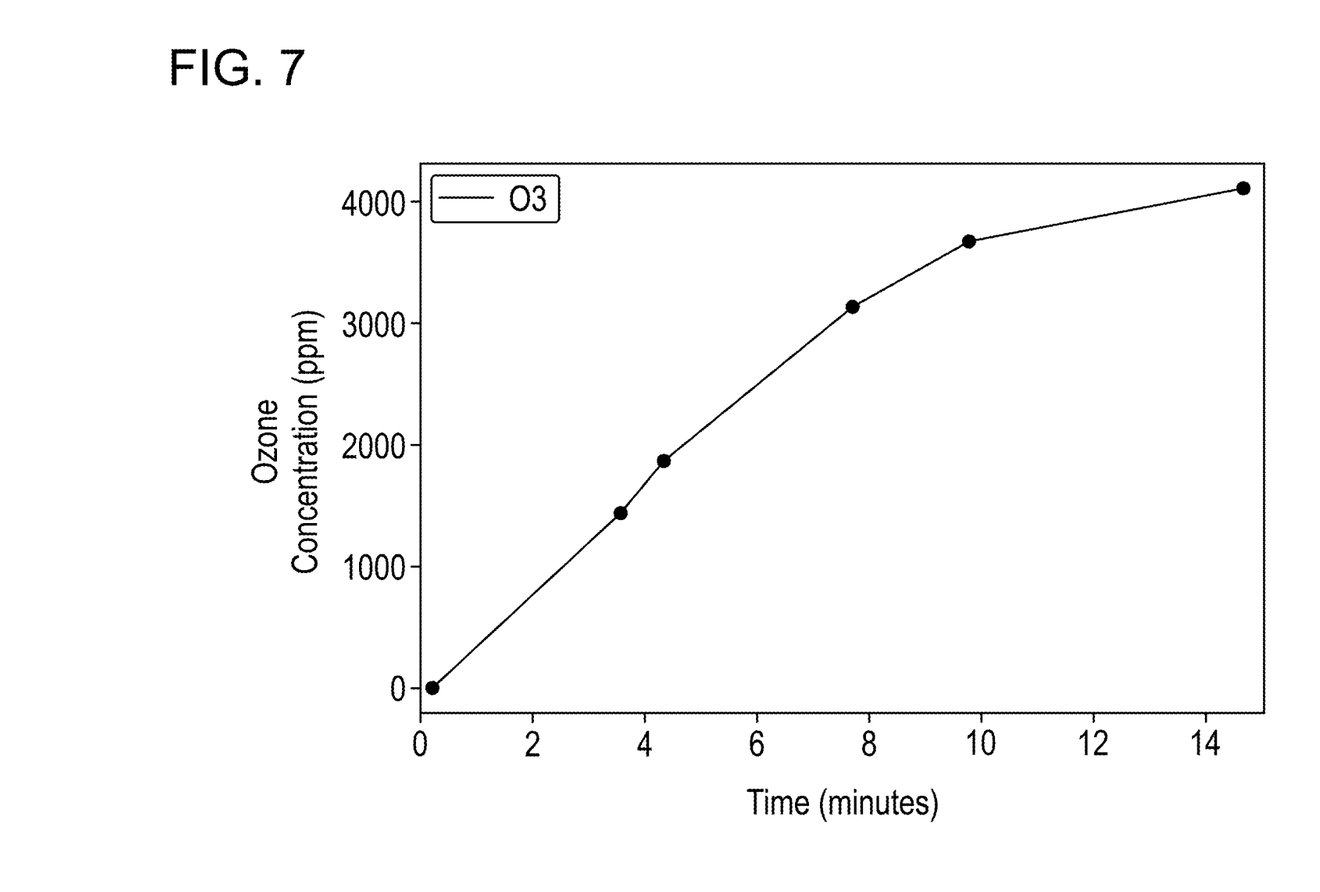
FIG. 7 is a graph of ozone concentration (ppm) versus time minutes and shows the ozone concentration in the DBD when using a configuration having a ratio of electrode area to chamber volume of 0.009 $cm^{-1}$.

The ozone concentration was determined by FTIR analysis, the results of which are shown in FIG. 7. Analysis by FTIR found that the ozone concentration increased to and equilibrated at about 4000 ppm. While not wanting to be bound by theory, it is understood that the equilibration occurred because initially ozone is formed, then $O_3$ and $N_2$ to react form $NO_x$ species. It is understood that once the $O_3$ generation and rate of $O_3$ reaction with $N_2$ become equal, the ozone concentration is effectively stabilized.

Example 11

Ratio of Electrode Area to Chamber Volume of 0.17

Figure 8:
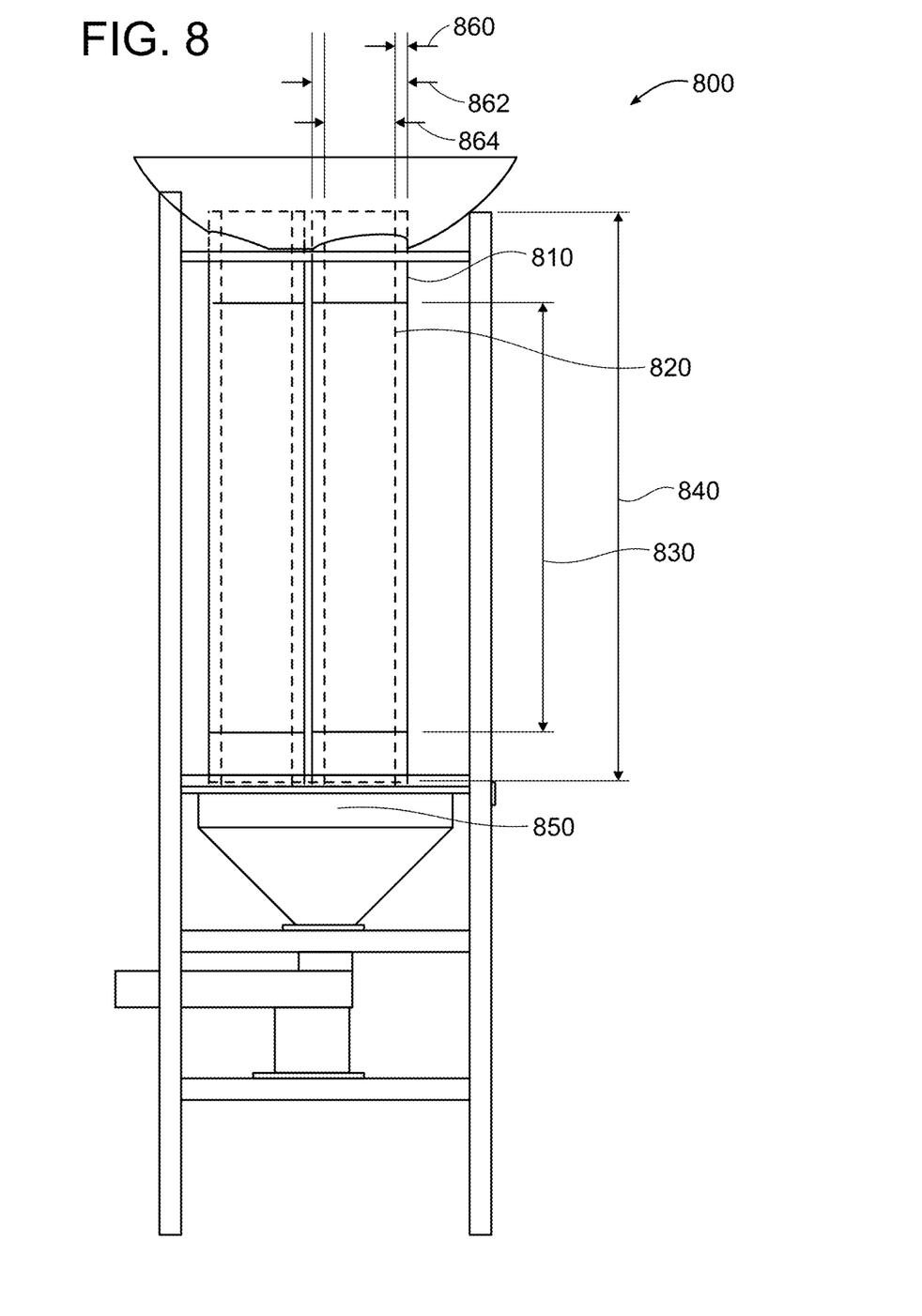
FIG. 8 is a schematic diagram showing an elevation view of an embodiment of a DBD having a ratio of electrode area to chamber volume of 0.17 $cm^{-1}$.
Figure 9:
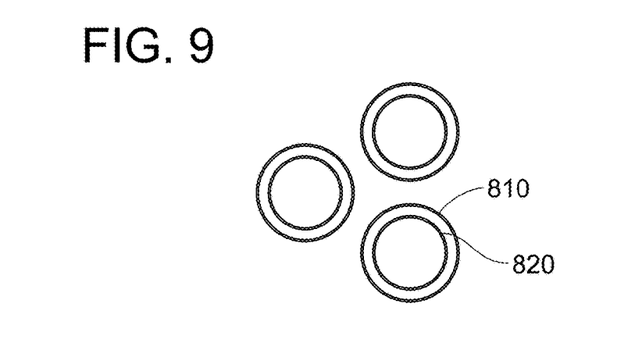
FIG. 9 is a plan view of the electrodes of the DBD shown in FIG. 8.
Figure 10:
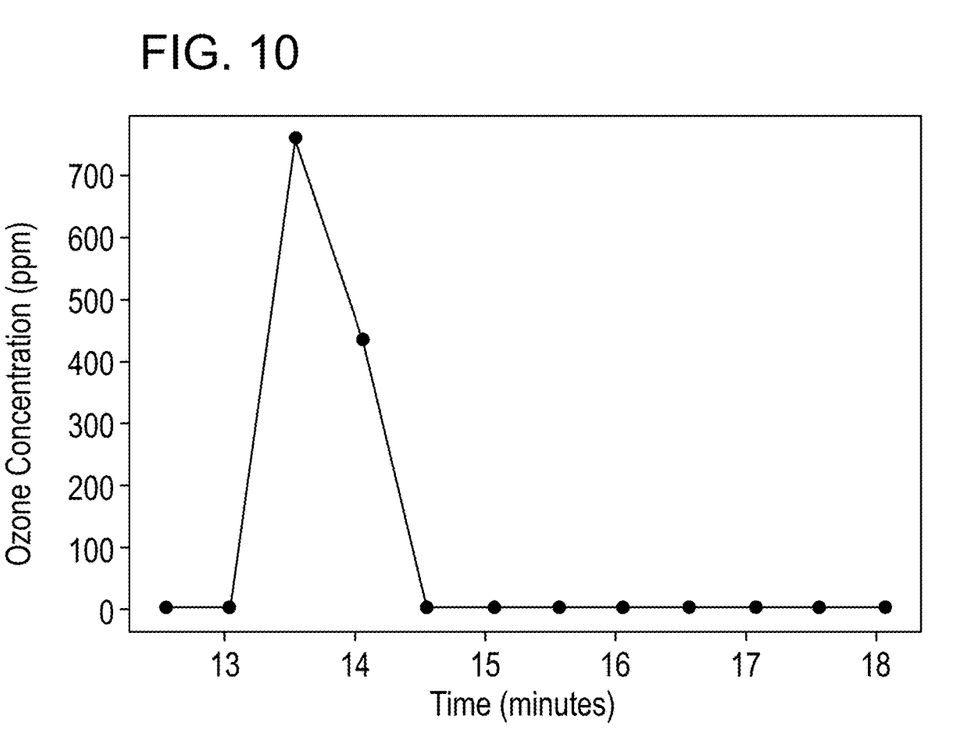
FIG. 10 is a graph of ozone concentration (ppm) versus time minutes and shows the ozone concentration in the DBD when using configuration having a ratio of electrode area to chamber volume of 0.17 $cm^{-1}$.

A DBD having a coaxial configuration, as shown in FIGS. 8 and 9 was used. The coaxial DBD 800 included cylindrical chamber 810 and an electrode 820 within the chamber. As shown the electrode length 830 was less than the length of the chamber 840. The electrode is aluminum and had an area of 2945 $cm^2$, and the chamber a volume of 17289 $cm^3$, thus the DBD had an area to volume ratio of 0.17. The outer diameter of the inner electrode 864 was 15.2 cm (6 inches) and the inner diameter of the outer electrode 862 was 19.7 cm (7.75 inches) to provide a gap 860 of 4.5 cm (1.75 inches). The feed gas was air having a relative humidity of 35% RH. The ozone concentration was determined by FTIR analysis of the working gas, sampled at the end 850 of the chamber. The results of the FTIR analysis are shown in FIG. 10, which depicts the concentration of $O_3$ over time. The $O_3$ concentration initially increases to about 750 ppm, then subsequently falls to near zero. While not wanting to be bound by theory, it is understood that the reduction in ozone concentration after 14 minutes is understood to occur because the greater ozone concentration at the electrode surface results in increased ozone reaction with nitrogen when the ozone is present in greater concentrations when using a greater ratio of electrode area to chamber volume.

Humidity can be determined according to ASTM E337, "Standard Test Method for Measuring Humidity with a Psychrometer (the Measurement of Wet- and Dry-Bulb Temperatures).

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The upper and lower limits of ranges are each independently combinable, unless stated otherwise.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A system, comprising:
at least one gas supply, the at least one gas supply collectively configured to produce a feed gas that includes at least 75 vol % nitrogen and less than 1.5 vol % oxygen;
a humidifier configured to humidify the feed gas to at least a 50% relative humidity (RH);
a gas inlet configured to provide the feed gas between a pair of electrodes; and
a voltage source coupled to the pair of electrodes, the voltage source configured to apply an electric potential between the pair of electrodes, causing a reaction with the feed gas to generate a working gas having an ozone content of less than 20 ppm.

2. The system of claim 1, wherein the pair of electrodes is disposed in a chamber, a ratio of the pair of electrode area to chamber volume is greater than 0.005 cm$^{-1}$.

3. The system of claim 1, wherein the voltage source is configured to provide an electric potential of at least 30 kV per centimeter gap between the pair of electrodes.

4. The system of claim 1, wherein the at least one gas supply is further configured to produce the feed gas including 0 vol % to 30 vol % carbon dioxide.

5. The system of claim 1, wherein the at least one gas supply is further configured to produce the feed gas including 5 vol % to 20 vol % carbon dioxide.

6. The system of claim 1, further comprising a food between the electrodes.

7. The system of claim 1, wherein the voltage source is configured to operate at 20 kV to 500 kV.

8. The system of claim 7, wherein the voltage source is configured to operate at a frequency of less than 500 kHz.

9. The system of claim 8, wherein the voltage source is configured to operate at a frequency of 30 Hz to 120 kHz.

10. The system of claim 1, wherein the at least one gas supply includes a nitrogen gas supply.

11. The system of claim 4, wherein the at least one gas supply includes a nitrogen gas supply and a carbon dioxide gas supply.

12. A system for treating a food, the system comprising:
at least one gas supply, the at least one gas supply collectively configured to produce a feed gas with less than 3 vol % oxygen;
a humidifier configured to humidify the feed gas to at least a 20% relative humidity (RH);
a gas inlet configured to provide the feed gas between a pair of electrodes, the pair of electrodes disposed in a chamber,
a ratio of an area of the pair of electrodes to a volume of the chamber is greater than 0.005 cm$^{-1}$; and
a voltage source coupled to the pair of electrodes, the voltage source configured to apply an electric potential between the pair of electrodes, causing a reaction with the feed gas to generate a working gas having an ozone content of less than 4000 ppm.

13. The system of claim 12, wherein the pair of electrodes are separated by a gap between 0.5 cm to 4 cm.

14. The system of claim 12, wherein the at least one gas supply is configured to produce the feed gas that includes between 100 ppm to 3 vol % oxygen.

15. The system of claim 12, wherein the humidifier is further configured to humidify the feed gas to 20% RH to 99% RH.

16. The system of claim 12, wherein the voltage source is configured to provide an electric potential of 30 kV to 120 kV between the pair of electrodes.

17. The system of claim 12, wherein the voltage source is configured to provide an electric potential of at least 30 kV per centimeter gap between the pair of electrodes.

18. The system of claim 12, wherein the at least one gas supply is further configured to produce the feed gas including carbon dioxide.

19. The system of claim 18, wherein the at least one gas supply is configured to produce the feed gas including at least 5 vol % carbon dioxide.

20. The system of claim 19, wherein the at least one gas supply is configured to produce the feed gas including 5 vol % to 20 vol % carbon dioxide.

21. The system of claim 19, wherein the at least one gas supply is configured to produce the feed gas including 25 vol % to 35 vol % carbon dioxide, based on a total volume of the nitrogen, the oxygen, and the carbon dioxide in the feed gas.

22. The system of claim 12, further comprising a food between the electrodes.

23. The system of claim 12, wherein the voltage source is configured to operate at 20 kV to 500 kV.

24. The system of claim 23, wherein the voltage source is configured to operate at a frequency of less than 500 kHz.

25. The system of claim 24, wherein the voltage source is configured to operate at a frequency of 30 Hz to 120 kHz.

26. The system of claim 12, wherein the at least one gas supply includes a nitrogen gas supply.

27. The system of claim 18, wherein the at least one gas supply includes a nitrogen gas supply.

* * * * *